Dec. 16, 1969  J. A. KOZULIS ET AL  3,484,244
FERMENTING AND AGING A MALT BEVERAGE
Filed March 30, 1967
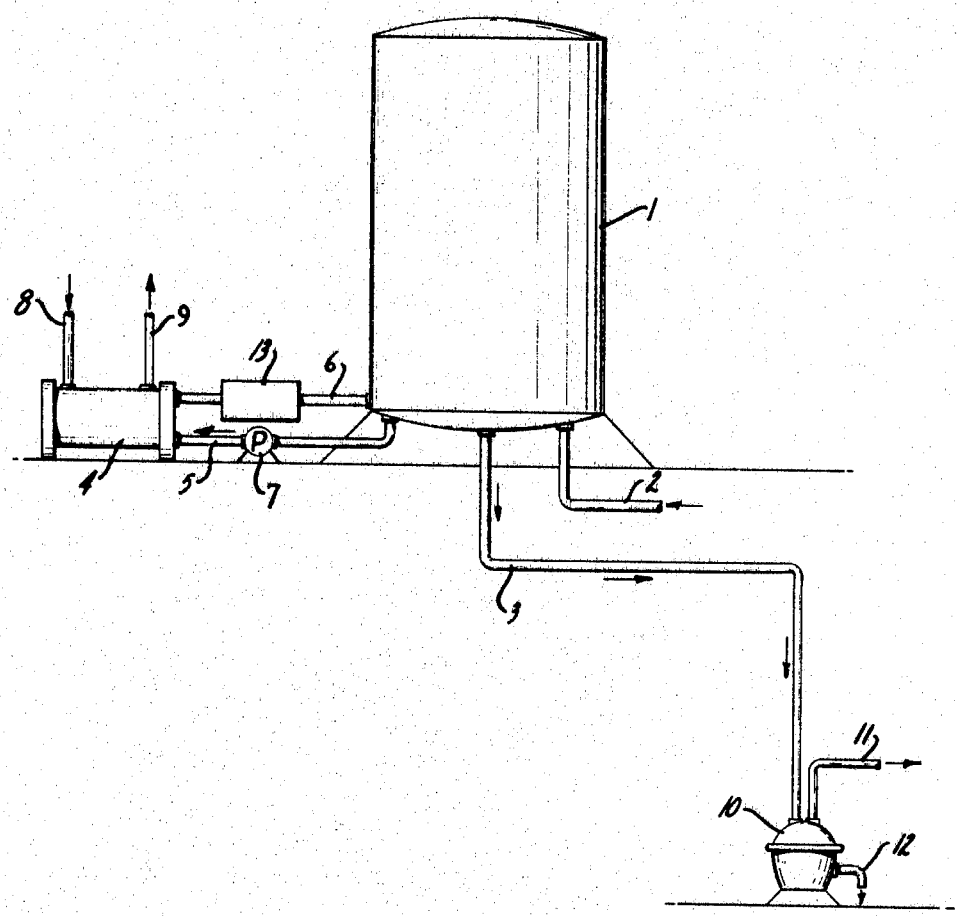
INVENTORS
JOSEPH A. KOZULIS
PETER D. BAYNE
BY
*Andrus & Starke*
*Attorneys*

United States Patent Office 3,484,244
Patented Dec. 16, 1969

3,484,244
FERMENTING AND AGING A MALT BEVERAGE
Joseph A. Kozulis, Fox Point, and Peter D. Bayne, Shorewood, Wis., assignors to Jos. Schlitz Brewing Co., Milwaukee, Wis., a corporation of Wisconsin
Continuation-in-part of application Ser. No. 543,142, Apr. 18, 1966. This application Mar. 30, 1967, Ser. No. 635,637
Int. Cl. C12c 1/00
U.S. Cl. 99—31                     12 Claims

ABSTRACT OF THE DISCLOSURE

A fermented malt beverage is prepared by fermenting a malt substrate at a temperature of 45° to 70° F. while circulating the substrate through a closed system. When the specific gravity of the substrate falls below 5° Plato, the temperature of the circulating substrate is raised to a higher temperature, below 75° F. and the substrate is aged at this elevated temperature.

---

This invention is a continuation-in-part of application Ser. No. 543,142, filed Apr. 18, 1966, now abandoned and entitled Process for Fermenting and Storing a Malt Beverage.

This invention relates to a method of brewing and more particularly to a method of fermenting and aging a malt beverage.

In the conventional brewing process, wort is pitched with yeast and then placed in a fermenting tank for a period of about three to fifteen days, during which time the yeast enzymes act on the sugar to ferment the wort. The normal practice during fermentation is to maintain the wort in a static condition, without agitation, although in some fermentation processes the wort may be slowly agitated by stirring. After fermentation, the yeast is allowed to settle and the supernatant fermented wort is then pumped to a storage tank located in a refrigerated cellar and is stored at a temperature of about 32° to 45° F. for a period of seven to thirty days. A small quantity of yeast is suspended in the fermented wort and carried out with it. During this storage period, the beer is again maintained in a static condition without agitation and the resdual yeast acts to enzymatically mature the beer and change the unpleasant and sulphurous by-products of fermentation into more neutral flavor and odor constituents. Thus, the historical practice in brewing has been to maintain the wort in a substantially static condition during fermentation and aging due to the traditional belief that agitation would contribute bitter autolyzed yeast characteristics to the beer.

The present invention is directed to a method of fermenting and aging a malt beverage which is based on a concept directly opposed to traditional brewing practices. More specifically, the wort is introduced into a tank and pitched with yeast. Following the addition of yeast, the wort is continuously circulated from the tank to a heat exchanger and returned to the tank in a closed flow system. A cooling medium is supplied to the heat exchanger to maintain the wort at a temperature in the range of 45° to 70° F. during the fermentation process.

When the fermentation has proceeded to a point where the specific gravity of the wort falls to a predetermined value below 5° Plato the supply of the cooling medium to the heat exchanger is terminated and the fermented wort circulating within the closed system will gradually increase in temperature due to the heat generated by the fermentation process. The temperature of the fermented wort is permitted to rise until it reaches a value at least 4° above the fermenting temperature, and generally in the range of 50 to 75° F., and is maintained at this temperature by controlled circulation of the cooling medium. At this time the yeast is still present in the beer and the beer is continuously circulated through the system for a period of about one to five days and until the diacetyl content falls to a value below 0.2 p.p.m. and the acetaldehyde content decreases to a value below 5 p.p.m. At this time, the beer is considered to be fully aged or matured.

At the end of the maturation cycle, the temperature of the circulating beer is reduced to a value of about 29° to 32° F. approaching the freezing point of beer. With the beer at this temperature, the beer is withdrawn from the tank and pumped through a centrifuge to remove the yeast. Following the removal of yeast, the beer is prefiltered and carbonated, injected with enzymes, and other additives, polish filtered, the carbonation adjusted and then is stored in government storage tanks for packaging in accordance with conventional brewing procedures. In some instances, only one filtration may be necessary to prepare the beer for packaging.

In a modified form of the invention, after the fermentation has proceeded to a point where the specific gravity of the wort falls to a given value below 5° Plato, the temperature of the wort is permitted to rise to a value at least 4° above the fermenting temperature and in the range of 50 to 75° F. In this form of the invention, when the diacetyl content of the wort decreases to a value below 0.5 p.p.m., the temperature is reduced to a value in the range of 32 to 55° F. and preferably about 34° to 38° F. and the beer is continuously circulated at this temperature for a period of about one to five days to provide the final aging or maturation. At the end of the maturation cycle, the beer is processed by conventional practices previously described.

By continuously circulating the wort, both during the fermenting and aging operations, the overall time required for the brewing process is substantially reduced to a period of less than six days compared with a period of twenty to forty days for the conventional brewing process.

Moreover, the present invention requires only a single tank for both fermenting and aging, while the conventional process requires separate tanks for fermenting and aging. In the conventional process, the storage tanks are maintained in refrigerated cellars and the cost of installing the refrigerated cellars is substantial. In contrast to this, the present brewing process does not require that the fermenting and aging tank be located within a refrigerated building or cellar for the cooling is accomplished by continuously circulating the wort through the heat exchanger and the fermenting and aging tank can be located either indoors or outdoors.

The continuous circulation of the wort during the fermenting and aging operations provides a better distribution of the yeast throughout the wort so that the yeast cells are brought into more intimate contact with the fermentable substrate of the wort, thereby resulting in greater efficiency and a more uniform product. The beer produced by the process of the invention has organoleptic properties substantially identical to those of beer brewed by conventional processes and is virtually indistinguishable in flavor, taste and odor.

A further object of the invention is to bring the fermenting and aging processes under control of automatic instrumentation so that the operations can be controlled from a central point and brought under, if necessary, computer control. The techniques used for temperature and flow control lend themselves readily to automatic control and a commercial scale process can be run completely without attendance, the process being continuously monitored by computer thereby resulting in further gains in labor-savings and product uniformity.

Other objects and advantages will appear in the course of the following description.

The drawing is a diagrammatic view showing the apparatus used in carrying out the brewing process of the invention.

In the drawing, the wort which is pitched with yeast is contained within a tank 1 that normally would be located outside of a building and coated or covered with a layer of heat insulating material. The wort is supplied to the tank 1 through an inlet conduit 2 and is withdrawn from the tank through an outlet conduit 3 which communicates with the lower end of the tank.

The temperature of the wort is precisely controlled during the fermenting and aging by continuously circulating the wort through a heat exchanger 4 which is connected to the tank by lines 5 and 6. The wort is continuously withdrawn from the tank 1 through line 5 by pump 7, flows through the heat exchanger and is returned to the tank through line 6.

A cooling medium is supplied to the heat exchanger 4 through a supply line 8 and is discharged through line 9, and the flow of coolant through heat exchanger 4 can be controlled either by manual or by automatically operated valves, not shown.

The discharge conduit 3 of tank 1 is connected to a centrifuge 10 which serves to remove the yeast from the fermented beer, and the beer is discharged from the centrifuge 10 through conduit 11 while the yeast is discharged through line 12.

Connected in line 6 is a bank 13 of automatic instruments which may include an oxygen monitor, a wort specific gravity meter, and a temperature sensing element. Also, the bank 13 may include an in-line analyzer to monitor both the diacetyl and acetaldehyde contents of the product in process. The signals from these instruments can serve to control process variables, such as temperature, and program future operations such as discharge and centrifugation. Under computer control, the output from these sensors can be stored to serve as a continuous record of the operation. When certain trends, such as gravity, indicate that the beer is ready for aging, the computer can then automatically adjust the temperature to the proper level. Once the proper aging cycle has been completed, and the diacetyl and acetaldehyde contents are within proper limits, the tank can be automatically discharged and its contents centrifuged.

In carrying out the process the wort is pitched or inoculated with yeast either before the wort is introduced into tank 1 or when the wort is in the tank. The wort is then continuously circulated by pump 7 through the closed system which, as previously mentioned, includes the tank 1, conduit 5, heat exchanger 4, and conduit 6. The flow of the cooling medium to the heat exchanger 4 is adjusted so that the temperature of the circulating wort in the system is maintained at a value of 45° to 70° F. and preferably 50° to 60° F. If the wort is pitched with a bottom fermenting yeast, the fermentation will normally be carried out at a temperature in the lower portion of the 45° to 70° F. range, generally between 45° and 60° F., while if an ale yeast is used to pitch the wort, a temperature in the upper portion of the range, in the neighborhood of 55° F. to 70° F., will generally be used during fermenting.

During the circulation of the wort the yeast enzymes act on the fermentable substrate of the wort and the circulation of the wort provides a more intimate contact beween the yeast cells and the fermentable substrate.

Diacetyl is a by-product of fermentation and imparts a buttery, green taste to the beer. Although the carbohydrates might be completely consumed in a short period of time, a high residual diacetyl content in the end fermented beer makes the resultant beer objectionable regardless of further maturation in storage. Therefore the reduction of the diacetyl content proceeds more slowly than the uptake of sugar and additional time is involved in waiting until the diacetyl has been enzymatically reduced to an organoleptically suitable level, generally below 0.2 p.p.m. We have unexpectedly found that by raising the temperature of the fermenting wort after most of the carbohydrate has been assimilated, the diacetyl reduction phase can be greatly accelerated, thereby greatly decreasing the residence time in the tank. The heat generated by the metabolism of the carbohydrates in the wort raises the temperature of the wort, increasing the reaction rate of the enzymes involved in reducing diacetyl to natural substances. Therefore when the specific gravity of the circulating wort reaches a predetermined value below 5° Plato, and generally a predetermined value in the range of 3° to 4° Plato, the circulation of the cooling medium through heat exchanger 4 is stopped, while the circulation of the wort through the closed system is continued. As the cooling effect has been terminated, the temperature of the wort will gradually rise due to the heat generated by the fermentation of the residual extract in the wort. During this portion of the process, the wort is maintained at a temperature at least 4° F. above the fermenting temperature and in the range of 50 to 75° F., and preferably about 60° F., by controlled circulation of the cooling medium to the heat exchanger 4.

At this time, the yeast is still in the beer and the fermented wort is continuously circulated at the temperature in the range of 50 to 75° F. to age or mature the beer. During this aging period, the yeast acts to enzymatically cure the beer by changing the unpleasant and sulphurous by-products of fermentation into more neutral flavor and odor constituents. The specific time in which the beer is circulated for aging is generally from two to five days with the specific time being determined by the organoleptic qualities of the product. As an index of maturation the fermented wort is continuously circulated until the diacetyl content reaches a value less than 0.2 p.p.m., and preferably to a value below 0.1 p.p.m., and the acetaldehyde content of the fermented wort decreases to a predetermined value below 5 p.p.m. When these values are reached, the aging process is considered complete. At the end of the maturation or aging period, the flow of coolant is re-adjusted to cool the circulating beer to a temperature in the range of 29° to 32° F. which approaches the freezing point of beer.

When the beer has reached this temperature, the beer is withdrawn from the tank 1 through the outlet conduit 3 and is pumped to the centrifuge 10 where the yeast and haze components are removed by centrifugation. Cooling the beer to the 29° to 32° F. temperature range prior to centrifugation provides a better separation of the yeast and haze components.

Following the centrifugation, the beer is processed by conventional practice which generally includes prefiltration and carbonation, injection of enzymes and other beer additives, polish filtration, final carbonation and transfer to the government storage tanks prior to packaging. Both filtration steps may be accomplished in one process as the yeast centrifuge substantially removes yeast and haze components that ordinarily would be removed in prefiltration.

In some circumstances, the yeast can be removed from the wort after fermentation and before the aging. In this case the fermented wort is pumped from the tank 1 to the centrifuge 10 and the clarified wort is then returned to the tank 1 for the aging process. In this alternative procedure the major portion of the yeast is removed by the centrifuge, leaving a yeast concentration of approximately 6,000,000 yeast cells per millimeter of wort and the remaining yeast cells act during the aging process to enzymatically mature the beer. It is preferred, however, to maintain the original yeast concentration in the beer during the aging process for this eliminates the mechanical step of centrifuging between fermentation and aging, and provides a larger quantity of yeast to accelerate the enzymatic maturation of the beer during aging. As previously noted, the aging is carried on for a period of about one to five days. However, if a portion of the yeast is removed prior to aging, the aging period can be extended up to fifteen or thirty days without any adverse effect on the beer, but such an extended aging period does not noticeably improve the organoleptic properties of the beer and has no advantage from a practical standpoint.

The rate of flow of the wort through the system during the fermentation and aging processes is not particularly critical. However, the flow of wort should be continuous and normally, the flow should be at a rate so that the entire capacity of the tank 1 will be moved at least once an hour. For example, if the tank 1 has a capacity of 300 barrels the flow rate should be at least 300 barrels per hour.

As an alternate procedure, the beer can be maintained in a tank during aging or maturation, rather than being circulated through a closed system as shown in the drawing. In a situation where the beer is maintained in a tank during aging, the beer is continuously agitated or stirred to achieve the desired intimate contact between the yeast cells and the beer. Thus, the term "agitated," as used in the description and claims, is intended to cover pumping, stirring or any other means of maintaining the yeast in suspension in the beer.

In a second form of the invention, the aging is carried on at a somewhat reduced temperature over that described in the first embodiment. As in the case of the first embodiment, the flow of the cooling medium to the heat exchanger is adjusted so that the temperature of the circulating wort in the system is maintained at a value of 45° to 70° F. until the specific gravity of the circulating wort reaches a predetermined value below 5° Plato and generally a value in the range of 3° to 4° Plato. When this gravity is reached, the circulation of the cooling medium through heat exchanger 4 is stopped, while the circulation of the wort through the closed system is continued. As the cooling effect has been terminated, the temperature of the wort will gradually rise due to the heat generated by the fermentation of the residual extract in the wort. The temperature of the wort is maintained at least 4° F. above the fermenting temperature and in the range of 50 to 75° F., and preferably about 65° F., by controlled circulation of the cooling medium to the heat exchanger 4.

In this process, when the diacetyl content of the wort decreases to a predetermined value below 0.5 p.p.m., the cooling medium is again supplied to the heat exchanger 4 at a rate sufficient to reduce the temperature of the circulating fermented wort to a value of 32 to 55° F., and preferably a temperature of about 34 to 38° F. The wort is continuously circulated through the system at this temperature for a period of one to five days, depending on the organoleptic properties which are desired in the final product. When the acetaldehyde content of the fermenting wort drops to a predetermined value below 5 p.p.m., the aging process is considered complete. At the end of the aging period, the flow of coolant is adjusted to cool the circulating beer to a temperature in the range of 29 to 32° F. which approaches the freezing point of beer. Following this, the beer is withdrawn from the tank and centrifuged and further treated, as described with respect to the first embodiment.

Specific examples of the process of the invention are as follows:

Example No. 1

300 barrels of wort were introduced into a tank and pitched with bottom fermenting yeast. The tank was connected in a closed flow system with a heat exchanger. The wort was circulated through the heat exchanger at a flow rate of 300 barrels per hours and the flow of coolant to the heat exchanger was adjusted to maintain the temperature of the circulating wort at 56° F. The wort was fermented to a gravity of 4° Plato which took approximately two and one-half days. When this gravity was reached, the flow of coolant to the heat exchanger was terminated while maintaining the flow rate of the wort through the circulating system at 300 barrels per hour. The temperature of the wort slowly rose due to the heat generated by fermentation to 60° F. and was maintained at 60° F. by controlled flow of coolant through the heat exchanger.

The fermented wort was circulated at this temperature until the acetaldehyde content reached 3 p.p.m. and the diacetyl content fell below 0.1 p.p.m. which required a period of about four days. The beer was then cooled to a temperature of 29° F. and pumped from the tank to a centrifuge where the yeast was removed. The centrifuged beer was then processed by conventional brewing techniques.

Example No. 2

300 barrels of wort introduced into the tank 1 and pitched with yeast. The worth was circulated through the heat exchanger at a flow rate of 300 barrels per hour and the flow of coolant to the heat exchanger was adjusted to maintain the temperature of the circulating wort at 56° F. The wort was fermented to a gravity of 3.5° Plato which took approximately 2½ days. When this gravity was reached, the flow of coolant to the heat exchanger was terminated while maintaining the flow rate of the wort through the circulation system at 300 barrels per hour. The temperature of the wort slowly rose due to the heat generated by fermentation to a maximum of 65° F. When the diacetyl content reached 0.2 p.p.m. after approximately 1½ days, coolant was supplied to the heat exchanger at a rate sufficient to drop the temperature of the circulating wort to a value of 36° F. The fermented wort was circulated at this temperature until the acetaldehyde content reached 3 p.p.m., a period of approximately one day. The beer was then cooled to a value of 29° F. and pumped from the tank 1 to a centrifuge where the yeast was removed. The centrifuged beer was then processed by conventional brewing techniques.

The present invention is directed to a method of fermenting and aging a malt beverage which is directly opposed to conventional brewing procedures. According to the invention the wort is continuously circulated during fermenting and aging. Historically, it was considered necessary to ferment and age beer for long periods under static conditions at cold temperatures in order to get a clear, well aged beer. By continuously circulating the wort during the fermenting and aging operations, the present process is directly opposed to the historical procedures. This novel method substantially shortens the overall brewing period while producing a fully acceptable beer from an organoleptic standpoint.

The process of the invention also has distinct advantages over continuous fermenting processes in which the fermentable wort is continuously flowed through either a single fermenting tank or a series of fermenting tanks, and the fermented wort is thereafter aged under static conditions, without agitation, in the traditional manner. The conventional continuous fermentation process requires a continuous supply of wort which is highly susceptible to microbiological contamination and spoilage, and the process requires a high concentration of yeast which is retained in the fermenting tank for long periods, thereby resulting in the development of yeasty off-flavors in the beer that cannot be eliminated in the aging process. Moreover, continuous fermentation processes of this type require complex control systems to maintain uniformity in the product, and require higher fermenting temperatures which add to the development of undesirable off-flavors.

The process of the invention overcomes the inherent disadvantages of continuous fermentation processes by continuously circulating a given batch of wort during both the fermenting and aging operations and produces a beer having completely acceptable organoleptic properties. Further, the time required by the recirculating fermenting and aging process is substantially the same as the combination of continuous fermentation and static aging, with the advantage the end product is free from off-flavors and odors and is identical with beer produced by the traditional batch fermentation and aging method.

With the use of the present process, only a single tank for fermenting and storing is required, as opposed to the conventional process which requires separate tanks for fermenting and storing. Due to the accelerated fermenting and aging and due to the fact that only a single tank is required, the overall tank volume or capacity for a given output of beer is reduced to about one-sixth that of a conventional brewing process. By reducing the required number of tanks, a substantial labor savings is achieved because it is necessary to clean each tank after transfer. As a further advantage, a cost saving in sanitizing chemicals is achieved because fewer tanks and piping lines are required to be cleaned after each transfer.

The reduction in tank volume also cuts the capital outlay and maintenance costs to a value of about one-sixth that of a conventional process, and similarly reduces shrinkage or handling loss by the same factor, as the shrinkage, which occurs through leakage, residue in pipes and tanks, etc. is dependent on the number of tanks, hookups and transfers.

It is not necessary to locate the tank in a refrigerated cellar or building as in the conventional process for the wort is cooled by circulating through the heat exchanger. The tank can be located either indoors or outdoors and is preferably coated with a heat insulating material to provide better control of the wort temperature in the system.

Bacteria tend to produce rancid, off-flavor products which may alter the organoleptic properties of the beer, and the process of the invention by substantially reducing the residence time of the product in the system over that of conventional brewing processes, greatly reduces the probability of bacteria contamination.

As a further advantage, the physical properties of the wort, such as specific gravity, temperature, diacetyl content, oxygen content and the like can be more accurately determined in a flowing stream, as in the present process, than in a static body where stratification occurs. The more accurate analytical readings will result in a more precisely controlled uniform product.

The process particularly lends itself to automatic instrumentation, and, if desired, computer control. The signals from the analytical instruments in the bank 13 can serve to control the process variables such as temperature, oxygen content as well as controlling the program operations such as centrifugation and discharge. It is contemplated that a production facility can be run completely without operator attendance, being completely controlled by computer, to provide optimum product uniformity.

Various modes of carrying out the invention are contemplated as being within the scope of the following claims, particularly pointing out and distinctly claiming the subject matter which is regarded as the invention.

We claim:

1. In a process of fermenting and aging a malt beverage, the steps of cooling a fermentable yeast-containing malt substrate to a fermentation temperature in the range of 45° to 70° F. while continuously circulating the substrate through a closed flow system to maintain the yeast in suspension in said substrate, terminating the cooling when the specific gravity of the substrate reaches a predetermined value below 5° Plato, maintaining at least a substantial portion of the yeast in the fermented substrate, raising the temperature of the yeast-containing fermented substrate by enzymatic action to an aging temperature at least 4° F. above said fermentation temperature and in the range of 50° F. to 75° F. while continuously agitating the substrate to keep the yeast in suspension in said substrate and while maintaining the substrate under anaerobic conditions to thereby age the substrate, terminating the aging after a period of time sufficient to obtain the desired organoleptic qualities, and thereafter removing the yeast from the aged beer.

2. The process of claim 1, in which said aging is terminated after the diacetyl content of said substrate decreases to a predetermined value below 0.2 p.p.m. and the acetaldehyde content reaches a predetermined value below 5 p.p.m.

3. In a process of fermenting and aging a malt beverage, the steps of continuously circulating a fermentable yeast-containing malt substrate through a closed system to maintain the yeast in suspension in said substrate, said closed system including a tank, a cooling unit, a supply conduit connecting the tank to the cooling unit and a return conduit connecting the cooling unit to the tank, adjusting the flow of coolant through the cooling unit to maintain the substrate in the system at a fermenting temperature of 45° to 70° F. until the specific gravity of the circulating substrate reaches a predetermined value below 5° Plato, maintaining at least a substantial portion of the yeast in contact with the fermented substrate, thereafter terminating the flow of coolant to the cooling unit to thereby permit the temperature of the fermented yeast-containing substrate to freely rise by enzymatic action to an aging temperature of at least 4° F. above said fermenting temperature and in the range of 50° F. to 75° F. thereafter continuously circulating the fermented substrate through said closed system to maintain the yeast in suspension in said substrate and age said substrate while maintaining the fermented substrate under anaerobic conditions during said aging, and thereafter separating the yeast from the aged substrate.

4. The process of claim 3, and including the step of terminating the aging after the diacetyl content of said substrate decerases to a predetermined value below 0.2 p.p.m. and the acetaldehyde content reaches a predetermined value below 5 p.p.m.

5. The process of claim 3, and including the step of reducing the temperature of the fermented substrate to a third temperature below said aging temperature and in the range of 32° F. to 55° F. when the diacetyl content of the fermented substrate decreases to a predetermined value below 0.5 p.p.m.

6. The process of claim 5, and including the step of maintaining the substrate at said third temperature until the acetaldehyde content of the substrate reaches a predetermined value below 5 p.p.m.

7. The process of claim 3, in which the substrate liquid is circulated at a rate such that the volume of the substrate in said tank is entirely displaced in a period of at least one hour.

8. In a process of fermenting and aging a fermentable substrate, the steps of fermenting a fermentable yeast-containing substrate by continuously agitating said substrate at a first temperature of 45° F. to 75° F. to maintain the yeast in suspension until a specific gravity of the fermented substrate decreases to a predetermined value below 5° Plato, maintaining at least a substantial portion of the yeast in suspension in the fermented substrate, raising the temperature of the fermented substrate to an aging temperature at least 4° F. above said first temperature and in the range of 50° F. to 75° F. by enzymatic action and continuously agitating the substrate at said aging temperature to maintain the yeast in suspension and age the substrate, and maintaining the fermented substrate under anaerobic conditions during said aging.

9. The process of claim 8, in which the fermented substrate aged until the acetaldehyde content reaches a predetermined value below 5 p.p.m. and the diacetyl content decreases to a predetermined value below 0.2 p.p.m.

10. The process of claim 8, in which the fermented substrate is aged for a period of one to five days.

11. The process of claim 8, in which said substrate is agitated by circulating the substrate through a closed flow system.

12. The process of claim 8, and including the step of separating the yeast from the aged substrate.

References Cited

UNITED STATES PATENTS

| | | | |
|---|---|---|---|
| 1,988,954 | 1/1935 | Nathan et al. | 99—48 |
| 2,249,792 | 7/1941 | Skinner | 99—103 |
| 3,071,469 | 1/1963 | Krabbe et al. | 99—48 |
| 3,130,055 | 4/1964 | Segel et al. | 99—31 |
| 3,345,179 | 10/1967 | Pollock et al. | 99—31 |

FOREIGN PATENTS 274,225   7/1927   Great Britain.

OTHER REFERENCES

De Clerck, J.: A Textbook of Brewing, vol. 1, 1957, Chapman and Hall, London, pp. 432–436.

LIONEL M. SHAPIRO, Primary Examiner

D. M. NAFF, Assistant Examiner

U.S. Cl. X.R.

99—48